Oct. 17, 1939.   H. T. NELSON   2,176,185
AIRPLANE
Filed July 21, 1938
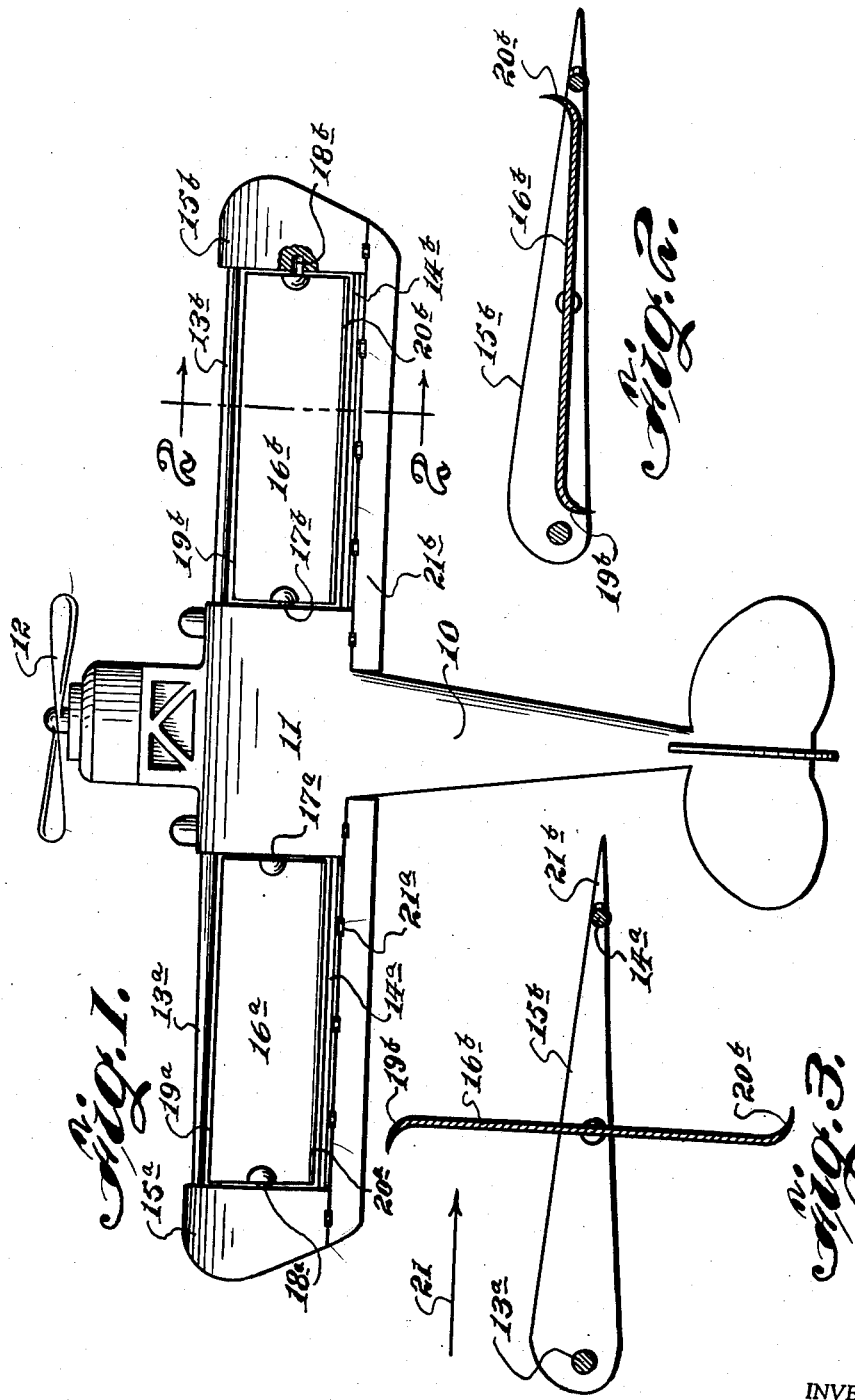
INVENTOR.
Harry T. Nelson Patented Oct. 17, 1939

2,176,185

UNITED STATES PATENT OFFICE 2,176,185

AIRPLANE

Harry T. Nelson, Dallas, Tex.

Application July 21, 1938, Serial No. 220,468

5 Claims. (Cl. 244—9)

This invention has to do with new and useful improvements in airplanes.

The object of the invention is to provide an airplane which may be used as a toy, a full-sized airplane or for any other purpose for which it is suitable.

Another object of the invention is to provide an airplane with rotating wings of special design and arrangement which permit quick take-offs from small areas and landings with very short ground runs.

An important object of the invention is to provide an airplane with rotating wings which will fly slowly with safety; one which is readily adaptable for observation, photography, survey and pleasure.

A still further object of the invention is to provide an airplane with rotating wings which permits slow landing speed and which may be used as a toy, thus permitting it to land with a minimum of danger of being damaged.

One of the most important objects of the invention is to provide an airplane with rotating wings which will give efficient lift at low rotating speed, thus reducing vibration to a minimum.

The invention will be more readily understood from a reading of the following specifications and by reference to the accompanying drawing, in which an example of the invention is shown and wherein:

Fig. 1 is a plan view of the invention,

Fig. 2 is a cross-section view of one of the wings of the invention, showing the rotating wing in a horizontal position; and Fig. 3 is likewise a cross-section view of a wing-showing the rotating wing in a vertical position.

In the drawing the numeral 10 designates the body or fuselage of an ordinary airplane. Section of wing 11 is also the usual type of airfoil such as is used in the conventional type of airplane. It extends horizontally on each side of 10 sufficiently far to be in the horizontal extent of the slipstream from propeller 12.

Extending outward from 11 are supports 13a, 13b, 14a and 14b. These are connected with wing sections 15a and 15b.

Rotating wings 16a and 16b are arranged to rotate freely in bearings 17a, 17b, 18a and 18b set in sections 11, 15a and 15b.

A cross-section of one of these rotating wings 16b is illustrated in Fig. 2. This shows the wing section in a horizontal position. I have experimented with a large number of shapes and find this one to be most satisfactory. It will be seen that the greater part of the cross-section is practically straight and is curved only at the edges, 19b and 19c, away from the axis of rotation so that the movement of the upper portion of the rotating wings is in the opposite direction to the movement of the airplane through the air.

With a rotating wing of this shape, an excellent lift is secured. The speed of rotation is slow, which eliminates the greater part of the vibration present when S shaped cross-sections are used. This is highly important in order to bring this type of airplane within the realm of practicality. When the high speed rotating wings are used the vibration soon shakes the airplane to pieces.

Figure 3 shows the same view as Fig. 2 except that the cross-section of rotating wing 16b is shown in a vertical position. Arrow 21 indicates the direction in which the top edge of the rotating wing moves when the airplane is in flight in the opposite direction.

Since an aircraft of this kind lands at such a steep angle when in a glide, I have added ailerons 21a and 21b which extend into the slipstream of propeller 12. These give better control in landing when it may be desirable to accelerate the propeller for a slight ground run.

I am aware of the fact that the principle of lift by a rotating wing is not new. However, a wing structure which is substantially a plane surface and which is curved only at the outer edges from the axis of rotation is new. It makes a much more simple structure to build and gives more effective lift. It rotates more slowly in flight and eliminates excessive vibration found in other types. My 7-foot gasoline powered model of this type has made a large number of successful flights, reaching an altitude of several hundred feet in many flights. It has always come in for an easy landing and has never cracked up. The rotating wings move slowly but are very effective. The problem of vibration has been eliminated.

While I have shown a wing surface 11 between the rotating wings, I do not want my claims limited to this arrangement. The invention will fly without it. The rotating wings should not be placed in the slipstream of the propeller because a great amount of drag and loss of efficiency would be the result. The section of wing 11 is included to assist in the lift of the rotating wings and to help brace the supporting structures.

Briefly, the invention is simply an ordinary airplane in most respects. The principal difference is that most of the wing out beyond the slipstream of the propeller is a rotating wing of special design built into the regular wing. These rotating wings are the same on each side and rotate freely and independently of the engine. Special ailerons are added which are extended into the slipstream. Wing surfaces 15a and 15b could be used for ailerons, however, there is an advantage in landing by having them in the slipstream due to slow landing speed.

Various other changes in the size and shape of the different parts, as well as modifications and alterations, may be made within the scope of the appended claims.

What I claim is:

1. In an airplane, a fuselage with conventional wing sections extending traversely from said fuselage substantially as far out as the slipstream of the propeller extends, and similar shaped rotating wings extending outwardly from these wing sections, each rotating wing being substantially flat except the outer edges from the axes, and such edges being curved outwardly from the rotating wing surface and in opposite directions, and said rotating wings being arranged, so that such curved edges extend forwardly at the top when their cross-sections are in a vertical position, and supports for such wings.

2. In an airplane, a fuselage with conventional wing sections extending traversely from said fuselage substantially as far out as the slipstream of the propeller extends, and similar shaped rotating wings extending outwardly from these wing sections, each rotating wing being substantially flat except the outer edges from the axes, and such edges being curved outwardly from the rotating wing surface and in opposite directions, and said rotating wings being arranged, so that such curved edges extend forwardly at the top when their cross-sections are in a vertical position, supports for such wings, and ailerons on each side of fuselage, said ailerons extending into the slipstream of the propeller.

3. In an airplane a fuselage, and rotor wings substantially outside of the propeller slipstream and supported by the fuselage, said rotor wings being mounted to rotate on axes transverse to the fuselage and having a substantially flat surface except at the edges away from the axes, said edges being extended in opposite directions from the axes.

4. An airplane fuselage including similarly shaped rotating wings on opposite sides of the fuselage and having their axes transverse to the fuselage, each rotating wing being relatively thin and substantially flat for nearly the entire width of the wing, said outer edges away from the axes being extended outwardly at opposite directions to each other, and means for supporting said wings in a position substantially outside of the slipstream at the rear of the propeller.

5. In an airplane including a fuselage and propeller mounted at the forward portion of the fuselage, similarly shaped rotating wings on opposite sides of the fuselage and having their axes transverse to the fuselage, each rotating wing being relatively thin and substantially flat except substantially at the outer edges away from the axes, said outer edges being curved outwardly in opposite directions, and means for supporting said wings substantially outside of the propeller slipstream.

HARRY T. NELSON.